(12) United States Patent
Uku

(10) Patent No.: US 7,884,975 B2
(45) Date of Patent: Feb. 8, 2011

(54) APPARATUS, METHOD AND PROGRAM PRODUCT FOR READING IMAGE

(75) Inventor: Kazuaki Uku, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1268 days.

(21) Appl. No.: 11/391,275

(22) Filed: Mar. 29, 2006

(65) Prior Publication Data
US 2007/0115516 A1    May 24, 2007

(30) Foreign Application Priority Data
Nov. 22, 2005    (JP) .............................. 2005-336929

(51) Int. Cl.
*H04N 1/04* (2006.01)

(52) U.S. Cl. ...................... 358/474; 358/408; 358/496; 358/498; 358/497; 399/367; 399/374; 271/4.01

(58) Field of Classification Search ................. 358/474, 358/496, 497, 498, 486, 488, 504, 532; 399/274, 399/275, 367, 374, 377, 363; 271/4.01
See application file for complete search history.

(56) References Cited

U.S. PATENT DOCUMENTS

| | | | | |
|---|---|---|---|---|
| 4,792,828 A * | 12/1988 | Ozawa et al. | ............... | 399/194 |
| 5,181,714 A * | 1/1993 | Yamagishi et al. | .......... | 271/186 |
| 5,298,937 A * | 3/1994 | Telle | ........................... | 355/23 |
| 5,490,667 A * | 2/1996 | Nagashima et al. | ......... | 271/225 |
| 6,721,074 B1 * | 4/2004 | Kao | ............................. | 358/496 |
| 6,901,237 B2 * | 5/2005 | Nakamura | .................. | 399/367 |
| 7,145,698 B2 | 12/2006 | Yamamoto | | |
| 2003/0170041 A1 * | 9/2003 | Katsuyama | ................... | 399/84 |
| 2004/0008386 A1 * | 1/2004 | Shiraishi | ..................... | 358/474 |
| 2004/0190084 A1 * | 9/2004 | Shirai | ......................... | 358/474 |
| 2006/0285182 A1 * | 12/2006 | Suzuki et al. | ............... | 358/532 |

(Continued)

FOREIGN PATENT DOCUMENTS

JP    A-10-028209    1/1998

(Continued)

OTHER PUBLICATIONS

Sep. 24, 2009 Notification of Reason(s) for Refusal issued in Japanese Patent Application No. 2005-336929 with English-language translation.

(Continued)

*Primary Examiner*—Negussie Worku
(74) *Attorney, Agent, or Firm*—Oliff & Berridge, PLC

(57) ABSTRACT

An image reading apparatus according to an embodiment of the present invention comprises: a first reading unit that reads an image on a front side of a document being transferred along a transfer path; a second reading unit that reads an image on a rear side of the document; a reversing unit arranged downstream of the first and the second reading units that turns the document over and place it on the transfer path; and a controller that causes, when a error is detected in the first or second reading units, the reversing unit to turn the document over and place it on the transfer path, so that a reading unit in which the error is not detected reads the image on the side to be read by the reading unit in which the error is detected.

14 Claims, 3 Drawing Sheets

U.S. PATENT DOCUMENTS

2007/0064286 A1    3/2007   Shiokawa et al.
2009/0027742 A1*   1/2009   Lee ........................... 358/497

FOREIGN PATENT DOCUMENTS

| JP | A-2001-042578 | 2/2001 |
| JP | A-2002-354192 | 12/2002 |
| JP | A-2004-023672 | 1/2004 |
| JP | A 2004-023672 | 1/2004 |
| JP | A 2004-343409 | 12/2004 |
| JP | A-2006-148294 | 6/2006 |
| JP | A-2007-088554 | 4/2007 |

OTHER PUBLICATIONS

Feb. 9, 2010 Office Action issued in Japanese patent application No. 2005-336929 (with translation).

* cited by examiner

APPARATUS, METHOD AND PROGRAM PRODUCT FOR READING IMAGE

BACKGROUND

1. Technical Field

The present invention relates to a technique for reading out an image from a document by converting the image into an electronic signal, and, in particular, to a technique for reading out the image from both sides of the document.

2. Related Art

Some conventional image reading apparatuses such as a digital copier or a scanner can concurrently read both front and rear sides of a document supplied by an automatic document feeder (ADF) by using respective reading units. The conventional image reading apparatus of this type has a defect in that malfunction of any of the reading unit results in suspension of the overall operation of the image reading apparatus; and the apparatus cannot be used until the malfunction is corrected.

SUMMARY

An image reading apparatus according to an embodiment of the present invention comprises: a first reading unit that reads an image on a front side of a document being transferred along a transfer path; a second reading unit that reads an image on a rear side of the document; a reversing unit arranged downstream of the first and the second reading units that turns the document over and place it on the transfer path; and a controller that causes, when a error is detected in the first or second reading units, the reversing unit to turn the document over and place it on the transfer path, so that a reading unit in which the error is not detected reads the image on the side to be read by the reading unit in which the error is detected.

BRIEF DESCRIPTION OF THE DRAWINGS

Embodiments of the present invention will now be described in detail based on the following figures, wherein.

DETAILED DESCRIPTION

An embodiment according to the present invention will be described hereinafter by referring to the attached drawings.

(A: Structure)

Figure 1:
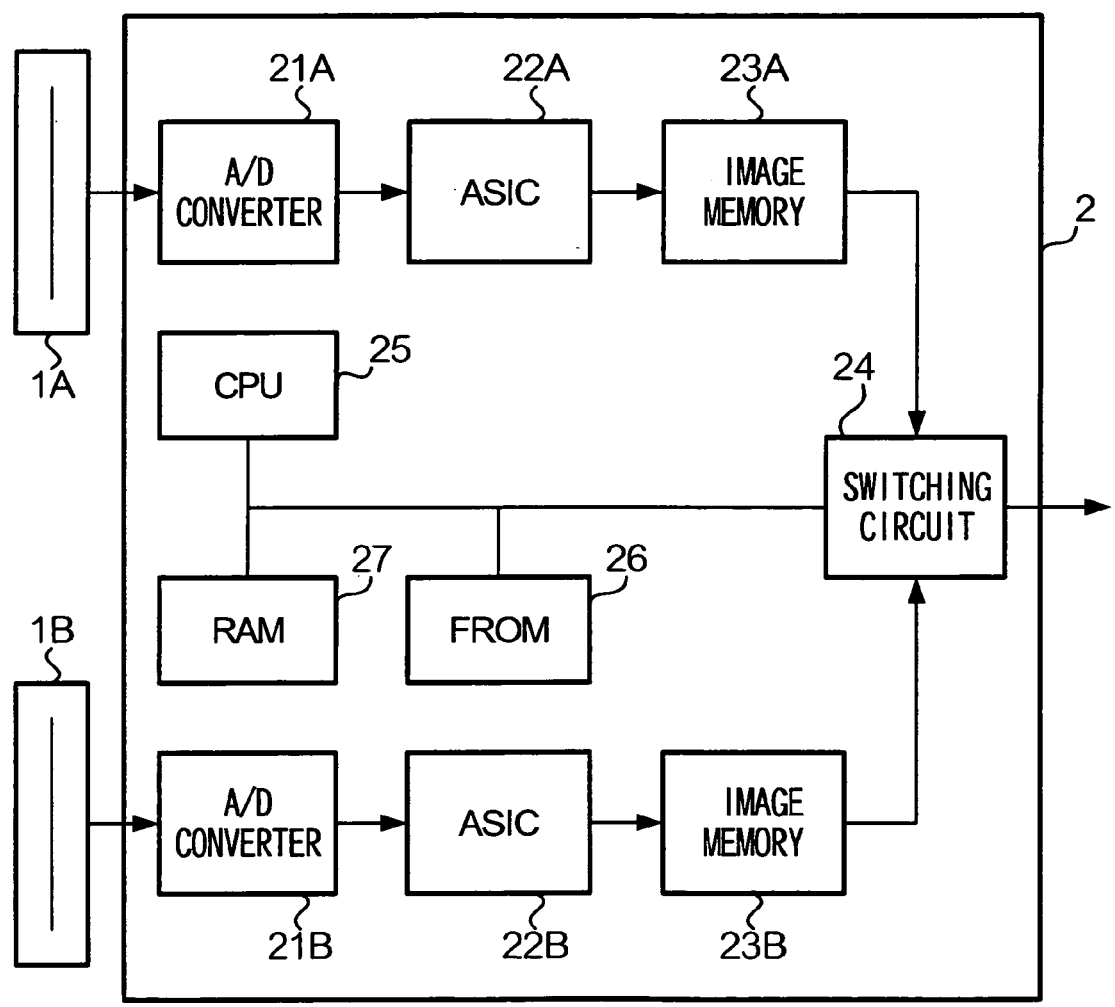
FIG. 1 is a block diagram showing the overall structure of an image reading apparatus according to an embodiment of the present invention.

FIG. 1 is a block diagram illustrating the structure of an image reading apparatus according to an embodiment of the present invention.

In FIG. 1, a first reading unit 1A and a second reading unit 1B respectively are constructed by a CCD line sensor for reading an image from a document transferred by a feeder (not shown). While the present embodiment is directed to a case where each of the reading units includes a CCD line sensor, it is possible to construct each of the first and second reading units with three CCD line sensors respectively corresponding to primary colors such as R, G, and B, for example.

Figure 2:
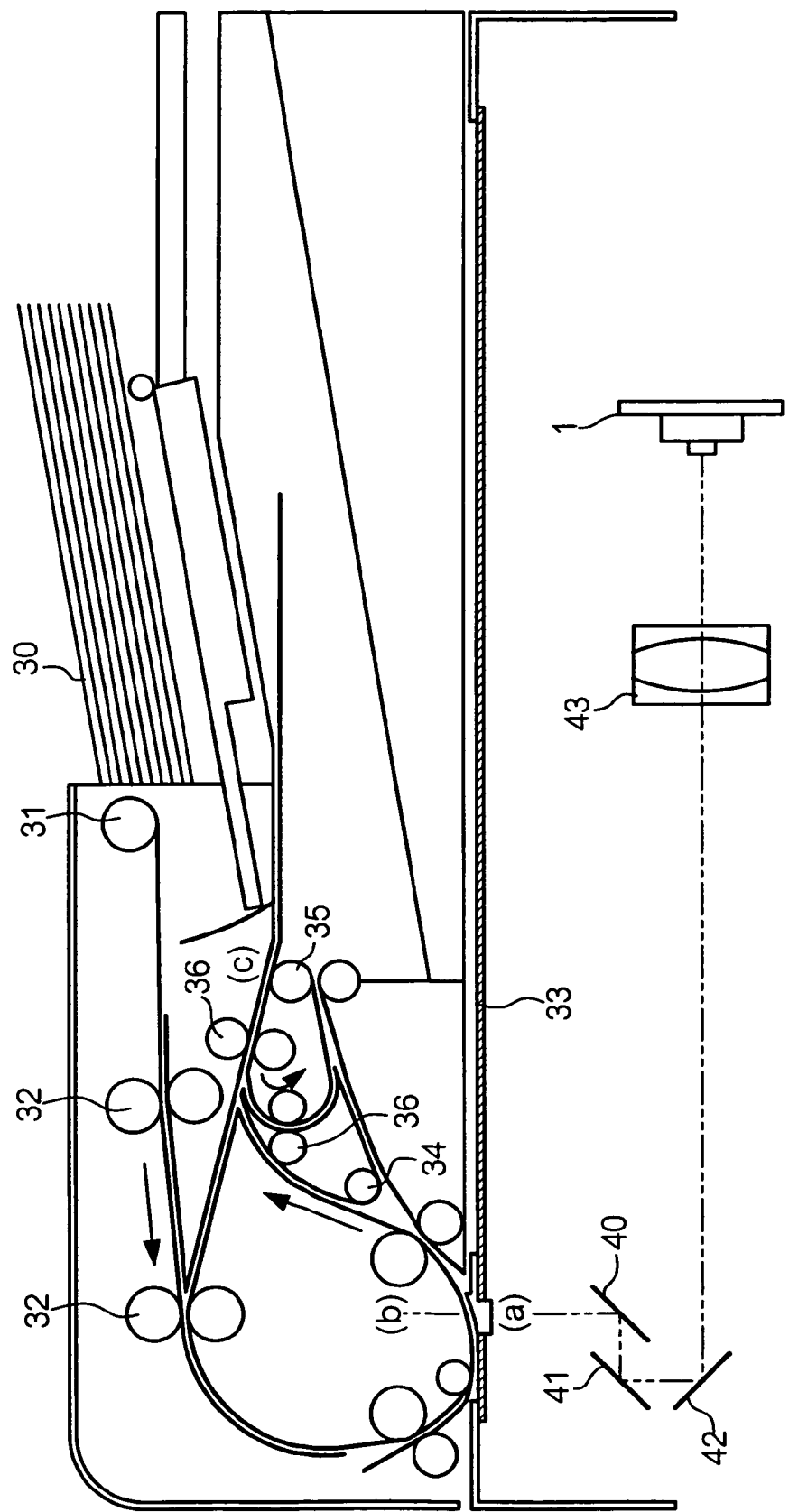
FIG. 2 is a view showing a document transferring system and an optical system of the image reading apparatus shown in FIG. 1.

FIG. 2 shows a configuration of a transfer path along which the transferring device transfers the document, and a configuration of an optical system starting from a reading position on the transfer path and leading to the first reading unit 1A. In FIG. 2, the documents 30 are set on a paper tray with the front side facing upward, and the documents are drawn in one by one by a draw-in roller 31 and are transferred at a constant speed while a direction of transfer rollers 32 is changed to cause their surface to come into contact with glass 33. A switching roller 34 further transfers the document to a position indicated by (c) in FIG. 2 or to a discharge roller. The document 30 transferred to the position (c) is then transferred along a reverse path by reversing rollers 36 to be reversed, and is then transferred again along the transfer path. Thus, the switching roller 34 and the reversing rollers 36 jointly function as a reversing unit for reversing the document and placing it in a forward orientation on the transfer path.

The first reading unit 1A reads an image on a front side of a document which is transferred by the transferring device at a preset reading position (a) in FIG. 2, by using a light source such as a commonly used lamp. The image of the document at the reading position reaches a CCD sensor constructing a first reading unit 1A with the light path direction reflected by each of a first mirror 40, a second mirror 41, and a third mirror 42, being changed, and the image being reduced by a lens 43. Meanwhile, second reading unit 1B in FIG. 1 is located at a position (b) in FIG. 2 for reading the image on a rear side of the document at the reading position using an LED as a light source. The CCD line sensors constructing the first and second reading units are arranged to output pixel signals representing pixel values of N pixels aligned on a line extending in a direction (main scanning direction) traversing the document transferring direction. While the present embodiment is directed to a case where the light source for the first reading unit 1A is a lamp and the light source of second reading unit 1B is an LED, it is possible to use an LED for the light source for the first reading unit 1A. Using LEDs for both the first and second reading units enables consumption of electric power to be reduced, and also enables a space for housing the light source to be made small in comparison with a case where lamps are used.

In the image reading apparatus according to the present embodiment, the image signal outputted from the first and second reading units is converted into digital image data by an image-processing circuit shown in FIG. 1, and thereafter is subjected to various image-processing steps before being outputted to a later stage processing device such as an image forming device. As shown in FIG. 1, image-processing circuit 2 has A/D converters 21A, 21B, ASICs 22A, 22B, image memories 23A, 23B, a switching circuit 24, a CPU 25, an FROM 26, and a RAM 27. The ASICs 22A, 22B and image memories 23A, 23B are connected to the CPU 25 via data lines (not shown) to enable delivery of signals or data by way of the data lines.

A/D converter 21A in FIG. 1 is used for performing digital conversion of the image signal output from the first reading unit 1A and for supplying the converted image to ASIC 22A; and A/D converter 21B in FIG. 1 is used for performing digital conversion of the image signal output from the second reading unit 1B, and for supplying it to ASIC 22B. A variety of compensation operations can be carried out on the signal, such as analog correction, before digital conversion is performed.

ASICs 22A, 22B in FIG. 1 are image-processing chips, which are used, for example, for carrying out a variety of image-processing steps, such as shading compensation, line compensation, mirroring or rotation of the supplied image data, and for outputting the result to the image memory. More specifically, ASICs 22A, 22B have a register for retaining parameters representing a content of the image-processing steps carried out on the image data that is delivered from the A/D converter, or analysis results of the image data, such that ASICs 22A, 22B are able to carry out the variety of image-processing steps by using the register, and output the process results to the image memory. More specifically, ASIC 22A outputs image data on which the variety of image-processing steps has been carried out to the image memory 23A; and ASIC 22B outputs the thus processed image data to the image memory 23B.

One example of an analysis result stored in the register may be a rate of occurrence of distribution of pixel values in image data. By obtaining this pixel value distribution rate, it is possible to determine whether image data is of a monochrome image or a color image, and to therefore accordingly carry out appropriate processing of the image data. Although a result of analysis of image data is used for determining image-processing steps to be carried out on the image data, in this embodiment, the result can also be used to determine whether a malfunction has occurred in the first device 1A or second reading unit, as is described later.

Image memory 23A in FIG. 1 is used for storing image data outputted from the ASIC 22A, and image memory 23B in FIG. 1 is used for storing image data outputted from ASIC 22B. That is, image memories 23A, 23B function as storage devices for storing image data representing images read by the first and second reading units. While the present embodiment is directed to a case in which respective memories for storing image data representing images read by the first reading unit 1A and second reading unit 1B are separately provided, these memories can be replaced by a single image memory the storage area of which is divided into two.

Switching circuit 24 in FIG. 1 is used for selectively outputting image data retained in the memory or image data retained in the memory, and is controlled by CPU 25.

CPU 25 in FIG. 1 executes a control program written in FROM 26 by using the RAM 27 as a work area, and controls operation of the switching circuit 24, while referring to the analysis result stored in the register within ASICs 22A, 22B via data lines (not shown), and determines whether a malfunction has occurred in the first or second reading units. More specifically, CPU 25 refers to the analysis result stored in the respective registers within ASICs 22A, 22B, and determines that a read error has occurred when a rate of occurrence of a pixel having a prescribed pixel value (that is, a ratio of pixels having the prescribed pixel value, such as a white pixel, to the total pixels) is not more than a predetermined value.

When CPU 25 determines that a malfunction has occurred in the first or second reading units, CPU 25 operates the switching roller 34 or the reversing rollers 36 to reverse the document, and control the other reading unit to read the image on the side that is to be read by the reading unit that has failed. While the present embodiment is directed to a case where CPU 25 determines if a malfunction has occurred in the first or second reading units by referring to a stored content of the register within any of ASICs 22A, 22B, it is possible to enable CPU 25 to determine if a malfunction has occurred by referring to a stored content of any of image memories 23A, 23B. More specifically, CPU 25 refers to an analysis result stored in respective image memories 23A, 23B, and determines that a read error has occurred if a rate of pixels having a prescribed pixel value (e.g., a white pixel) is not more than a predetermined value.

(B: Operation)

Next, an example of the flow of the image-processing step performed by the image reading apparatus according to the present embodiment will be described by referring to FIG. 3.

Figure 3:
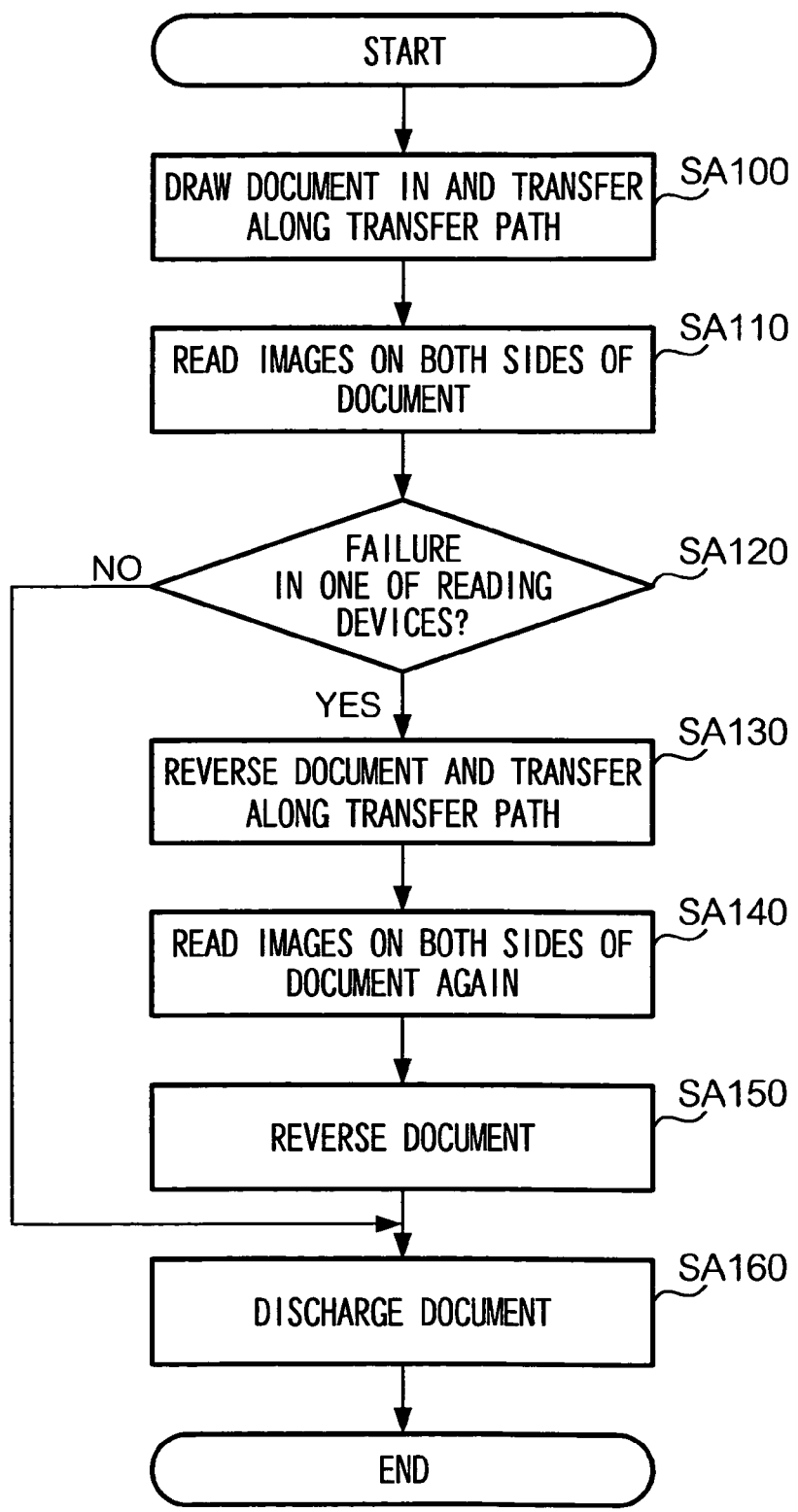
FIG. 3 is a flowchart showing the process flow of the image reading apparatus shown in FIG. 1.

FIG. 3 is a flowchart showing the image-processing steps performed by the image reading apparatus according to the present embodiment. When the documents are set at the paper tray and a reading start command is issued by a user by performing an operation such as pushing a start button on an operation panel (not shown), the documents are drawn in one by one into the image reading apparatus by the document feeder and are transferred along the transfer path shown in FIG. 2, in step SA100.

The documents are transferred to the reading position such that an image on a front side of a each document is read by first reading unit 1A, and an image on the rear side of each document is read by second reading unit 1B in step SA110. The first and second reading units respectively output image signals corresponding to the read images, and these signals are converted into image data by respective A/D converters 21A, 21B; and image data are processed using prescribed image-processing steps by ASICs 22A, 22B, and are written in image memories 23A, 23B.

In step SA120 following step SA110, CPU 25 refers to the image-processing results stored in the registers within ASICs 22A, 22B as described above, and determines if a malfunction has occurred in at least one of either first reading unit 1A or second reading unit 1B. While the present embodiment is directed to a case where CPU 25 is caused to determine if a malfunction has occurred one of either the first or second reading units by referring to a stored content of the register within any of ASICs 22A, 22B, whereby it is possible to cause ASICs 22A, 22B to detect read errors based on a content stored in the respective registers, and to send a prescribed malfunction detection signal to CPU 25 when a read error is detected, to thereby notify CPU 25 of the occurrence of the read error.

While it is preferable that the process performed in step SA120 is completed before the document reaches the position (c), in the case that it is not, transfer of the document is temporarily suspended such that the document remains on standby at the position (c). A sensor can be provided at the position (c) for sensing when the document reaches the position (c). It is also possible to judge whether the process carried out in SA120 has been carried out by measuring an amount of time that lapses from a time at which the document leaves the reading position to a time when the document reaches position (c). Since a transfer speed of the document is constant, division of the distance between the reading position and the position (c) by the transfer speed provides a time required for the document to reach the position (c). Thus, when the measured time lapse reaches the calculated necessary time, the document is assumed to have reached the position (c).

If the judgment in step SA120 is "NO", that is, it is determined that neither first reading unit 1A or second reading unit 1B has malfunctioned or that both first reading unit 1A and second reading unit 1B have malfunctioned, CPU 25 operates switching roller 34 and reversing rollers 36 to discharge the document to a discharge tray in step SA160, to complete the image reading operation. When read errors are detected in both the first and second reading units, it is preferable to display a message on a display device (not shown) or to provide an audible warning message to notify a user that the image reading operation cannot be continued.

If the judgment in step SA120 is "YES", that is, a read error is detected in one of the first reading unit 1A or second reading unit 1B, the CPU 25 operates the reversing rollers 36 to reverse the document in step SA130 and place it upside down on the transfer path, and while it is transferred, CPU 25 again causes first reading unit 1A and second reading unit 1B to read respective images on both sides of the document in step SA140. If the judgment in step SA120 is "YES", a message can be outputted accordingly to notify the user. It is also possible to inform the user of a pixel location where the malfunction has occurred or of the pixel value, so that the user can determine if the malfunction is a hardware malfunction or is caused by dirt adhering to the reading position or the line sensors, so as to thereby enable maintenance to be improved.

It is worth noting here that, in the document reading process in step SA140, since the document is reversed in step SA130, first reading unit 1A reads the rear side image, and second reading unit 1B reads the front side image. Thus, if a read error is detected in first reading unit 1A, second reading unit 1B, which is functioning normally, will sequentially read both the front and rear sides of the document. In the reading process performed in step SA140, since the initial reading position is changed from that of the process performed in step SA110, the read out image should be mirrored by 180 degrees; while, in the reading process performed in step SA140, the document is read from its reward end edge. However, since the information for the size of the document is already made available to the image reading apparatus during the reading process in step SA110, it is possible to read the document at a proper size setting by using the information.

When the reading process in step SA140 is finished, CPU 25 controls the transferring device to transfer the document to an initial transferring direction while operating the switching roller 34 and the reversing rollers 36 to reverse the document again in step SA150, and discharges the document to the discharge tray in step 160, to finish the reading process. Since reversing the document again in step SA150 is performed to align the direction of a discharged document, the process of step SA150 can be omitted if document alignment is not necessary.

As is described above, when a malfunction occurs in first reading unit 1A, the rear and front sides of the documents are read by second reading unit 1B, and the image data of the rear side and the image data of the front side are written into image memory 23B, in that order. Thus, CPU 25 controls switching circuit 24 so as to output front image data prior to outputting rear side image data when reading out the image data stored in image memory 23B; for example, when an image-processing circuit 2 requests data output at a later stage or when the image-processing circuit 2 at a later stage is detected as ready to start image data processing. This control process is not necessary if an output order of data is of no consequence.

While the present embodiment is directed to a case where a malfunction occurs in first reading unit 1A for reading a front side of the document, if a malfunction occurs in second reading unit 1B for reading a rear side of the document, the reversing unit (switching roller 34 and reversing rollers 36) can be operated to reverse the document, and first reading unit 1A can be operated to sequentially read both the front and rear sides of the document.

As described above, according to the image reading apparatus of the present embodiment, despite detection of a malfunction of either first reading unit 1A or second reading unit 1B, it is possible to read each of a side of documents without the need for a user to carry out a complicated or time-consuming task, such as manually changing an orientation of documents for image reading.

(C: Modification)

While one embodiment of the present invention has been described, modifications thereto as described in the following are possible.

(1) While the embodiment described above is directed to a case where occurrence of a read error is detected by analyzing the read out results of a read out document of the first and second reading units, it is possible to detect the read error by analyzing any image for this purpose such as, for example, a white reference plate. More specifically, a blank reference plate can be read by the first and second reading units at a prescribed timing for analysis of the image to detect an occurrence of a read error. If a pixel value of image data read by the reading units is lower than a predetermined value, CPU 25 can determine that the read error has occurred. Using this process, a read error in the first and second reading units can be detected during shading compensation of a white level, which is carried out prior to a document image reading process.

(2) While the embodiment described above is directed to a case where the image reading apparatus is controlled to read both sides of a document, when a read error is detected in one of the first or second reading units, by using the other reading unit and the reversing unit, it is possible to cause the image reading apparatus to read both sides of the document, by using the reading unit that has not malfunctioned, in conjunction with the reversing unit. If a read error or mechanical failure in first reading unit 1A is detected prior to document image reading, it is possible to control the image reading apparatus to firstly reverse the document by using the reversing unit and to cause second reading unit 1B to read the front side image; and to then again reverse the document by using the reversing unit and to cause the second reading unit 1B to read the rear side image.

(3) In the embodiment described above, the image reading apparatus is controlled to operate the reversing rollers 36 to reverse the document and place it on the transfer path, when a read error is detected in one of the first or second reading units; and to cause the reading unit that has not malfunctioned to read the image on the side to be read by the failed reading unit. It is also possible to carry out reverse transfer of the document by using the reversing unit even if a read error is not detected in either of the first or second reading units, when, for example, the image reading apparatus is set to operate in a higher image quality mode. This process causes images on each of the sides of the document to be read by both the first or second reading units, respectively, so that the image reading apparatus can compare the two images on the same side of the document read by each of reading units 1A, 1B when outputting the read images. If there is a difference in the image information such as in color density value or a white area value being larger than a preset threshold value in the two images, it is possible for the user to accordingly select one of the two images for output by displaying a preview pane, for example. If the preview pane is outputted to an exterior display, it is desirable to retain data of the two images written in the image memories 23A, 23B until the user selects one of them to be outputted. It is also possible to cause the image reading apparatus to select one of the images, the image information of which is above a prescribed level, to be outputted by causing CPU 25 to control switching circuit 24, in place of the user. It is also possible to display on a display corresponding image information containing differences together with detailed information on a relevant part of an image being assessed.

(4) While the embodiment described above is directed to a case in which both sides of the document are read, when a read error is detected in one of first reading unit 1A or second reading unit 1B, by using the reading unit that has not malfunctioned it is possible to suspend the reading unit where the read error is detected when carrying out processes performed in the same job; and if the read error is caused by a hardware malfunction, use of the reading unit can be discontinued until it is repaired. More specifically, if first reading unit 1A malfunctions, both sides of the document are read by second reading unit 1B, and CPU 25 carries out a hardware DUP control. In order to handle a malfunction that can be easily resolved by cleaning instead of repairing, the image reading apparatus may determine if the malfunction has been resolved or not at an appropriate timing such as, when reading a new document, at the start of a new job, or after reading a prescribed number of documents, and if the malfunction has been resolved, the suspended reading unit is reset to be reusable.

(5) In the embodiment described above, both sides of the document are read by separately provided reading units. However, the image reading apparatus can be used for reading a one-sided document on which an image is formed on only one side of the document, by using either the first or second reading units. If the reading unit usually used for image reading malfunctions, it is possible to read the document by carrying out DUP control. And even when the usually used reading unit is not malfunctioning, it is possible to read the document by using both first and second reading units so that the user can select an image having better quality. Also, in order to read out a high quality image from various types of documents, the first and second reading units may be provided with light sources having different colors. More specifically, the first reading unit 1A may use a white lamp as the light source, and the second reading unit 1B may use a green LED as the light source.

(6) In the embodiment described above, both sides of a document can be read even when a read error is detected in one of the first or second reading units, by using the other reading unit in conjunction with the reversing unit. However, even in a case that a read error is not detected, the image reading apparatus may be operated by using one of the first or second reading units. For example, if the image reading apparatus has detected a sign suggesting that a read error may have occurred, such as overheating of the reading unit or a power shortage in the system, the image reading apparatus can select one of the first or second reading units that can be operated with less heat generation or less power consumption for carrying out reading of both sides of the document.

(7) While the embodiment described above is directed to a case where a program is provided in FROM 26 for causing CPU 25 to carry out the image reading process according to the present invention, it is possible to distribute the program via a storage medium such as a CD-ROM (Compact Disk-Read Only Memory) that is readable by a computer, or via a telecommunication route such as the Internet that allows downloading of the program. By installing the program to an image reading apparatus having first and second reading units and a reversing unit, the image reading apparatus can function in the same manner as the image reading apparatus according to the present invention.

An image reading apparatus according to an embodiment of the present invention comprises: a first reading unit that reads an image on a front side of a document being transferred along a transfer path; a second reading unit that reads an image on a rear side of the document; a reversing unit arranged downstream of the first and the second reading units that turns the document over and place it on the transfer path; and a controller that causes, when a read error or a malfunction is detected in the first or second reading units, the reversing unit to turn the document over and place it on the transfer path, so that a reading unit in which the read error or the malfunction is not detected reads the image on the side to be read by the reading unit in which the read error or the malfunction is detected.

According to the image reading apparatus of the present invention, when a read error or malfunction is detected in one of the first or second reading units, the document is turned upside down and placed on the transfer path, so that reading unit in which the read error and the malfunction is not detected read the image on the side that has to be read by the reading unit in which the read error or malfunction is detected.

In another embodiment, the controller may detect the read error or the malfunction of the first and second reading units by analyzing read out results of the first and the second reading units of a reference image.

In yet another embodiment, when a read error or a malfunction is detected in the first reading unit, the controller may cause the reversing unit to turn the document over and place it on the transfer path, to cause the second reading unit to read the image on the front side of the document, and thereafter cause the reversing unit to again turn the document over and to place it on the transfer path, to cause the second reading unit to read the image on the rear side of the document.

In yet another embodiment, the image reading apparatus may further comprise a storage unit for storing image data representing an image read by the first or second reading unit, wherein the controller reads out image data of the front side of the document from the storage unit and outputs the document, and thereafter reads out image data of the rear side of the document to output the same.

In yet another embodiment, an image reading method for use in an image reading apparatus which has a first reading unit for reading an image on a front side of a document that is being transferred along a transfer path and a second reading unit for reading an image on a rear side of the document is provided, the method comprising: detecting a read error or a malfunction in one of the first or second reading units; turning the document over and placing it on the transfer path; and causing the reading unit in which the read error and the malfunction is not detected to read the image on the side to be read by the reading unit in which the read error or the malfunction is detected.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for application in a variety of embodiments and modifications that are suited to a particular use that is contemplated. It is intended that the scope of the invention be defined by the following claims and their equivalents.

The entire disclosure of Japanese Patent Application No. 2005-336929 filed on Nov. 22, 2005 including specification, claims, drawings and abstract is incorporated herein by reference in its entirety.

What is claimed is:

1. An image reading apparatus comprising:
    a first reading unit that reads an image on a front side of a document being transferred along a transfer path;
    a second reading unit that reads an image on a rear side of the document;
    a reversing unit that is positioned on the transfer path after the first and second reading units, and that turns the document over and places it on the transfer path; and
    a controller that causes, when an error is detected in the first or second reading units, the reversing unit to physically turn the document over on its other side and place it on the transfer path, so that a reading unit in which the error is not detected reads the image on the side to be read by the reading unit in which the error is detected.

2. The image reading apparatus according to claim 1, wherein the controller detects the error of the first and second reading units by analyzing read out results of the first and the second reading units of a reference image.

3. The image reading apparatus according to claim 2, further comprising a storage unit for storing image data representing an image read by the first or second reading unit, wherein the controller reads out image data of the front side of the document from the storage unit and outputs the document, and thereafter reads out image data of the rear side of the document to output the same.

4. The image reading apparatus according to claim 1, wherein, when the error is detected in the first reading unit, the controller causes the reversing unit to turn the document over and place the document on the transfer path, to cause the second reading unit to read the image on the front side of the document, and thereafter causes the reversing unit to again turn the document over and to place the document on the transfer path, to cause the second reading unit to read the image on the rear side of the document.

5. The image reading apparatus according to claim 1, further comprising a storage unit for storing image data representing an image read by the first or second reading unit, wherein the controller reads out image data of the front side of the document from the storage unit and outputs the document, and thereafter reads out image data of the rear side of the document to output the same.

6. The image reading apparatus according to claim 1, wherein the error includes at least one of a read error, a malfunction, and a sign suggesting that the error may have occurred.

7. An image reading method comprising:
    reading an image on a front side of a document by a first reading unit, the document being transferred along a transfer path;
    reading an image on a rear side of the document by a second reading unit;
    positioning a reversing unit on the transfer path after the first and second reading units;
    detecting an error in one of the first or second reading units;
    turning the document over on its other side using the reversing unit, and placing it on the transfer path; and
    causing the reading unit in which the error is not detected to read the image on the side to be read by the reading unit in which the error is detected.

8. The image reading method according to claim 7, wherein detecting the error by analyzing read out results of the first and the second reading units of a reference image.

9. The image reading method according to claim 7, wherein, when the error is detected in the first reading unit, causing the reversing unit to turn the document over and place the document on the transfer path, to cause the second reading unit to read the image on the front side of the document, and thereafter causes the reversing unit to again turn the document over and to place the document on the transfer path, to cause the second reading unit to read the image on the rear side of the document.

10. The image reading method according to claim 7, wherein the error includes at least one of a read error, a malfunction, and a sign suggesting that the error may have occurred.

11. A non-transitory computer-readable storage medium encoded with a computer-executable program for enabling a computer to perform a function for reading an image, the function comprising:
    reading an image on a front side of a document by a first reading unit, the document being transferred along a transfer path;
    reading an image on a rear side of the document by a second reading unit;
    positioning a reversing unit on the transfer path after the first and second reading units;
    detecting an error in one of the first and second reading units,
    turning the document over on its other side using the reversing unit, and placing it on the transfer path; and
    causing the reading unit in which the error is not detected to read the image on the side to be read by the reading unit in which the error is detected.

12. The non-transitory computer-readable storage medium according to claim 11, wherein detecting the error by analyzing read out results of the first and the second reading units of a reference image.

13. The non-transitory computer-readable storage medium according to claim 11, wherein, when the error is detected in the first reading unit, causing the reversing unit to turn the document over and place the document on the transfer path, to cause the second reading unit to read the image on the front side of the document, and thereafter causes the reversing unit to again turn the document over and to place the document on the transfer path, to cause the second reading unit to read the image on the rear side of the document.

14. The non-transitory computer-readable storage medium according to claim 11, wherein the error includes at least one of a read error, a malfunction, and a sign suggesting that the error may have occurred.

* * * * *